(12) United States Patent
Mohler

(10) Patent No.: US 7,844,669 B1
(45) Date of Patent: Nov. 30, 2010

(54) OUT OF OFFICE AUTOREPLY FILTER

(75) Inventor: David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1266 days.

(21) Appl. No.: 10/944,062

(22) Filed: Sep. 16, 2004

(51) Int. Cl.
G06F 15/16 (2006.01)

(52) U.S. Cl. ....................................... 709/206; 709/207

(58) Field of Classification Search ................. 709/206, 709/207
See application file for complete search history.

(56) References Cited

U.S. PATENT DOCUMENTS

| | | | | |
|---|---|---|---|---|
| 6,393,465 | B2 * | 5/2002 | Leeds | 709/207 |
| 6,427,140 | B1 * | 7/2002 | Ginter et al. | 705/80 |
| 2002/0016824 | A1 * | 2/2002 | Leeds | 709/207 |
| 2003/0187996 | A1 * | 10/2003 | Cardina et al. | 709/228 |
| 2004/0152450 | A1 * | 8/2004 | Kouznetsov et al. | 455/412.1 |
| 2004/0181581 | A1 * | 9/2004 | Kosco | 709/206 |
| 2005/0021984 | A1 * | 1/2005 | Hollander | 713/186 |
| 2005/0055413 | A1 * | 3/2005 | Keohane et al. | 709/207 |
| 2006/0031333 | A1 * | 2/2006 | O'Neill | 709/206 |
| 2006/0031338 | A1 * | 2/2006 | Kang et al. | 709/206 |
| 2006/0043164 | A1 * | 3/2006 | Dowling et al. | 235/375 |

* cited by examiner

Primary Examiner—Jeffrey Pwu
Assistant Examiner—Gerald Smarth
(74) Attorney, Agent, or Firm—Sheridan Ross P.C.

(57) ABSTRACT

A system for selectively providing an out of office autoreply message in response to an incoming message is provided. The system avoids providing potentially sensitive or useful information to unauthorized senders of unsolicited messages, commonly known as spam. Accordingly, dramatic increases in such messages that can be experienced after a sender of such messages has confirmed the validity of a target address through the receipt of a reply message, can be avoided. In addition, security concerns associated with providing unknown senders of messages with information indicating that a user is out of the office are also avoided.

29 Claims, 3 Drawing Sheets

OUT OF OFFICE AUTOREPLY FILTER

FIELD OF THE INVENTION

The present invention relates to a messaging application or unified messaging application with selective autoreply. In particular, the present invention selectively provides an automated response to an incoming communication depending on characteristics associated with that communication.

BACKGROUND OF THE INVENTION

Various communication devices and channels are now available that allow communications or messages to be presented to users. For example, telephones associated with voice mailboxes allow voice messages to be left, and facsimile machines allow printed material to be presented to users. In addition, email provides a convenient method for presenting text messages, or even graphics and multimedia messages, to users.

In an attempt to reach as many potential consumers as possible, advertisers have taken advantage of these various devices and channels to present their messages to users. Unsolicited commercial messages, or spam, have become an increasing problem. For example, computer users are frequently faced with the reception of undesirable spam email. Spam generation engines, which indiscriminately send out huge volumes of messages to valid and invalid addresses, are becoming increasingly effective at getting through to the end user.

The problem of spam engines is complicated if the user has their "Out of Office" (OOF) autoreply on. If a user enables their OOF autoreply, an automatic response is sent to all spam messages, thereby confirming that the user's email address is valid. Once such a response is issued and therefore validated, the user's email address becomes much more valuable to advertisers. Furthermore, the autoreply may teach the spam generation engine to hone in on similar addresses to that of the user. The volume of spam that both the individual user and their email server will receive will increase if an address is known to be valid. The OOF autoreply response can empower spam generation engines to share the user's address with other spam generation engines, perpetuating the problem.

Because the user's signature block is frequently attached to the OOF autoreply or autoresponse, the sender of the spam may also be provided with additional information about the user, such as physical address and telephone number information. In addition to information about the particular user, the OOF autoreply may also provide the sender of the spam with information related to colleagues. For example if the OOF autoreply lists contacts that might be able to assist the user in their absence, the spam sender will receive that information.

The use of OOF autoreply also presents security issues. In particular, the OOF autoreply can tell one or more spam engines that the user's PC is unattended for a period of time and that the user may also be away from home. This can become a serious corporate and/or personal security breach if the sender of the spam is also involved in the theft of goods, services or intellectual capital. Some companies have banned the use of OOF autoreplies to help solve this problem. However, this solution of course makes OOF autoreplies unavailable to legitimate senders.

In order to limit spam, filters are available to direct spam to a special mailbox. Although such filters can assist a user in sorting legitimate messages from spam, they do not alter the behavior of the OOF autoreply.

With respect to voice or facsimile messages, voice greetings notifying the caller that the user is away from the office or otherwise unavailable are commonly used. Also, facsimile machines typically provide confirmation to a sending device that transmission of a facsimile message can begin and/or has been completed successfully. Both of these systems provide a means for senders of spam to verify the validity of a voice or facsimile telephone number, and can also provide additional information that may be undesirable to provide senders of spam. Although call blocking functionality may be available for handling unwanted calls, such tools do not alter the behavior of OOF autoreply or confirmation functions.

SUMMARY OF THE INVENTION

The present invention is directed to solving these and other problems and disadvantages of the prior art. In particular, embodiments of the present invention permit the provision of OOF autoreply with respect to legitimate senders of messages, while suppressing OOF autoreply with respect to spam or potential spam messages. More particularly, messages that are identified as legitimate are provided with the autoreply. Messages that are identified as spam may be ignored or deleted, and an OOF autoreply is not provided with respect to such messages. Messages that are identified as potential spam may be placed in a quarantine file, and an OOF autoreply is not provided with respect to such messages. Accordingly, embodiments of the present invention permit the behavior of an OOF autoreply function to be controlled. As used herein, spam refers to any unwanted message, regardless of the form of that message. Accordingly, examples of spam include commercial email messages, voice mail messages or facsimile transmissions.

In accordance with embodiments of the present invention, when an OOF autoreply function is enabled, a sending address or other information associated with an incoming communication is analyzed to determine whether that information corresponds to an entry in an authorized sender list available to and/or associated with the user (i.e. the target of the incoming message). If the incoming message is determined to be associated with an authorized sender, the message is received normally, and an OOF autoreply is provided.

In accordance with further embodiments of the present invention, an incoming message may also be analyzed to determine whether it is associated with a list of identified spam senders. The determination as to whether the incoming message is associated with a list of identified spam senders may be made after a determination that the message is not associated with an authorized sender. If the incoming message is determined to be associated with an identified spam sender, the OOF autoreply is suppressed, and the message may be ignored or deleted.

In accordance with still further embodiments of the present invention, incoming message may be filtered to determine whether it is a spam message. The determination as to whether a spam filter identifies a message as spam may be made after a determination that the message is not associated with an authorized sender. The determination as to whether a spam filter identifies a message as spam may also be made after or before a determination as to whether the incoming message is associated with a list of identified spam senders is made. If the incoming message is determined to comprise a spam message, the OOF autoreply is suppressed, and the message may be ignored or deleted.

Embodiments of the present invention may also provide for the quarantining of messages that are not identified as spam by comparison to a list of identified spam senders or by the operation of a spam filter. With respect to such messages, the operation of the OOF autoreply is suppressed, and the message is quarantined for later consideration by the user. As part of the control of the system, the user may adjust the contents of an authorized sender list, the contents of an unauthorized sender list, and/or the rules governing operation of the spam filter based on the user's analysis of a quarantined message.

Additional features and advantages of the present invention will become more readily apparent from the following description, particularly when taken together with the accompanying drawings.

DETAILED DESCRIPTION

Figure 1:
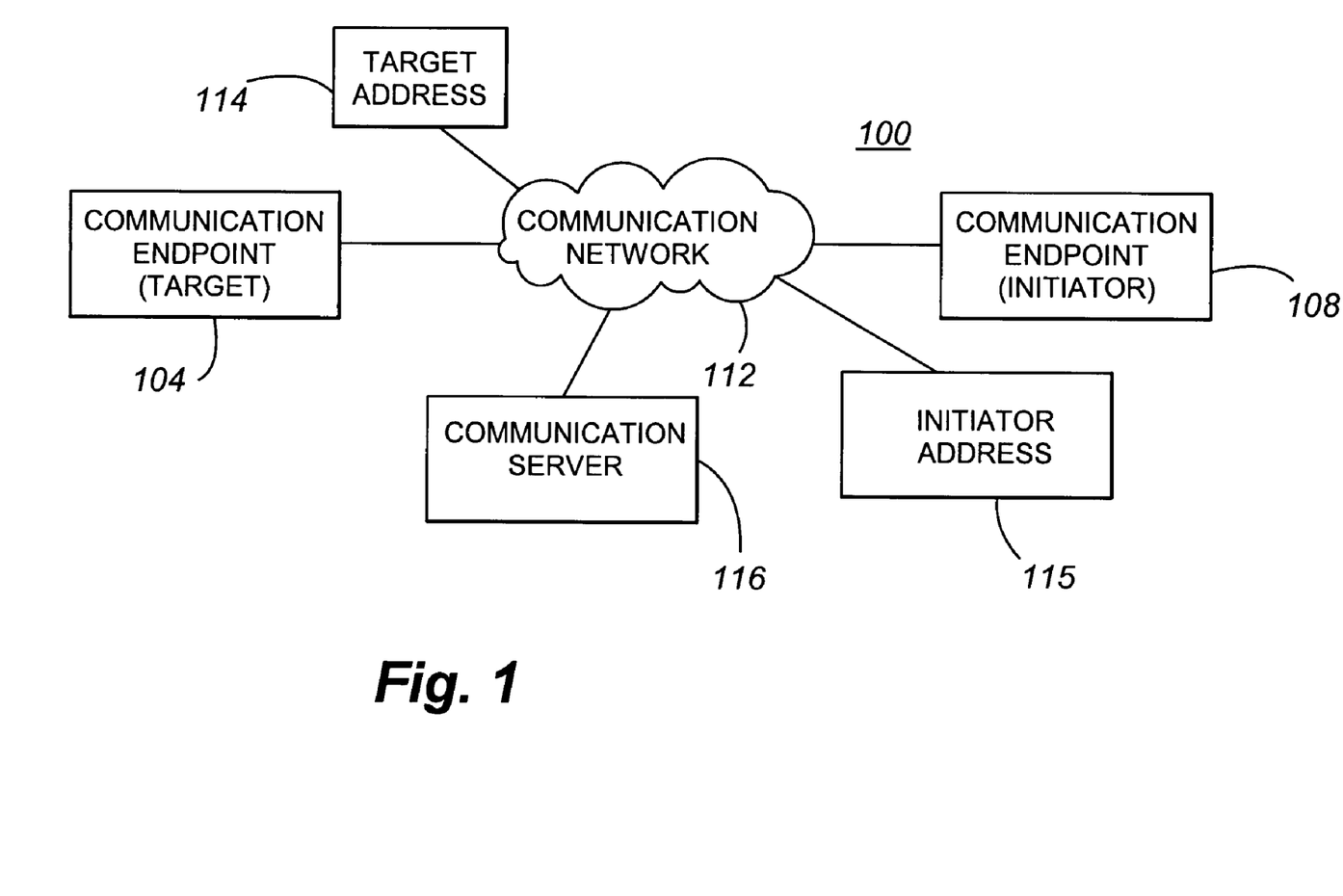
FIG. 1 is a block diagram depicting components of a system that allows for the selective application of an OOF autoreply in accordance with embodiments of the present invention.

With reference to FIG. 1, components of a system 100 that allows for the selective application of an out of office (OOF) autoreply or autoresponse function in accordance with embodiments of the present invention are illustrated. In general, the system 100 includes a target communication endpoint 104 interconnected to an initiator communication endpoint 108 by a communication network 112. The system 100 may also include a communication server 116.

An example of a target communication device 104 includes telephony devices, such as telephones, wireless telephones, soft telephones, video telephones, and facsimile (fax) machines. Additional examples of a target communication endpoint 104 include personal digital assistants (PDAs) having communication capabilities, and general purpose computing devices. Furthermore, as can be appreciated by one of skill in the art from the description provided herein, a target communication endpoint 104 can be part of a device providing a number of functions, for example an integrated PDA and cellular telephone. In general, the target communication endpoint 104 can access or is associated with a target address 114. The target address 114 may be of various forms, including an email address, voice telephone number, facsimile telephone number, instant messaging address, text messaging address, or any other address at which a message may be left for a user. Similarly, the initiator communication device 108 may be associated with an initiator address 115. The association between a communication endpoint 104, 108 and an associated address 114, 115 may be fixed, for example, in the case of a facsimile machine interconnected to a dedicated land line. Alternatively or in addition, the association between a communication endpoint 104, 108 and an associated address 114, 115 may be temporary, for example where a user accesses their e-mail account from a personal computer or PDA.

An initiator communication endpoint 108 may comprise the same types of communication devices as a target communication endpoint 104. In addition, an initiator communication endpoint 108 may comprise a spam generation application or server, an automatic dialer for voice or facsimile messages, or other automated or semi-automated device for sending commercial or other messages to communication endpoints in bulk and/or relatively indiscriminately.

The communication network 112 may comprise one or more networks of one or more types. For example, communications network 112 may comprise a packet data network, such as the Internet, intranet, VPN or a combination of one or more intranets and the Internet. As additional examples, the communication network 112 may comprise a switched circuit network, such as the public switched telephone network (PSTN), private switched network, or wireless voice and/or data networks, such as cellular telephone networks or networks supporting wireless PDAs. In addition, the communications network 112, may combine several of these network types into one larger communication path.

If provided, the communication server 116 is generally interconnected to the communication network 112. The communication server 116 may function to monitor communications and/or to store messages addressed to a particular target communication address 114 or groups of target communication addresses 114. Accordingly, examples of a communication server 116 include e-mail servers, voice messaging servers, or unified messaging servers. In addition, the communication server 116 may be local or remote with respect to a target communication endpoint 104. For example, a user of a target communication endpoint 104 may be able to access messages directed to that user (i.e. associated with a target communication address 114 of the user) by connecting to the communication server 116 over a local area network (LAN) or wide area network (WAN).

Figure 2:
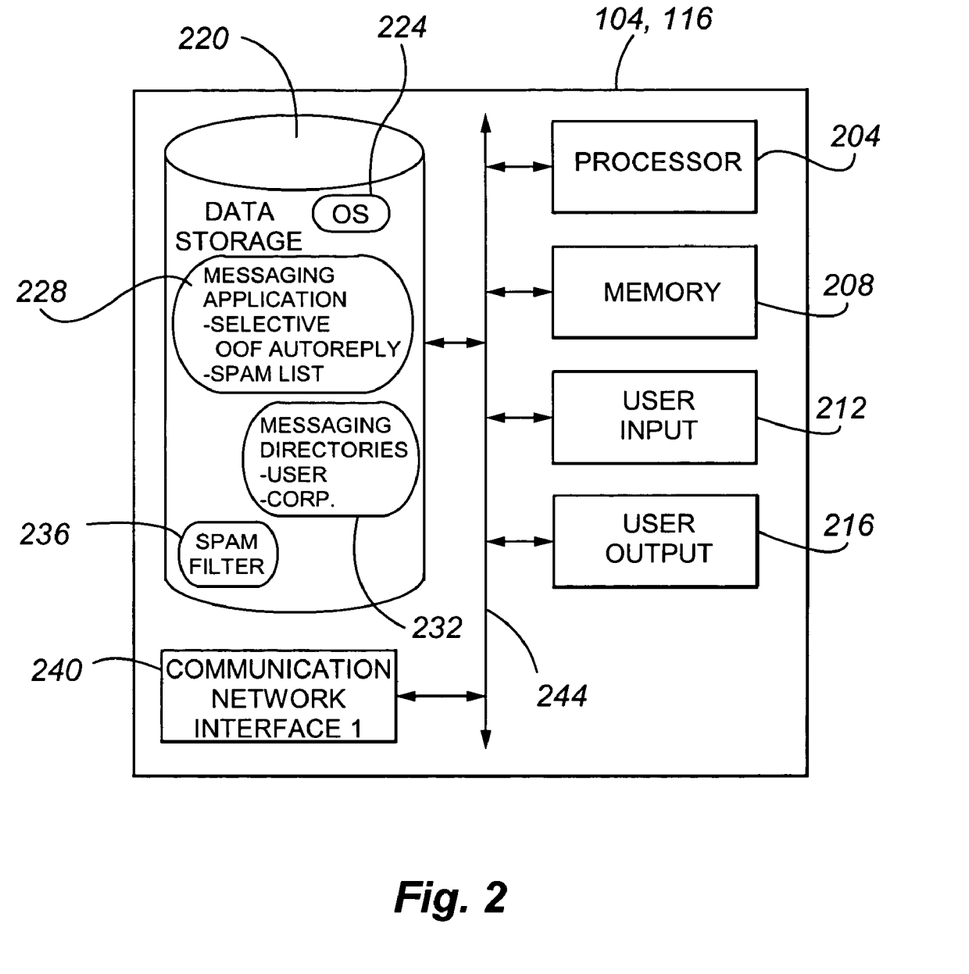
FIG. 2 is a block diagram of a communication endpoint or communication server that allows for the selective application of an OOF autoreply in accordance with embodiments of the present invention.

With reference now to FIG. 2, components of a target communication endpoint 104 or of a communication server 116 in accordance with embodiments of the present invention are depicted. The components may include a processor 204 capable of executing program instructions. Accordingly, the processor 204 may include any general purpose programmable processor or controller for executing application programming. Alternatively, the processor 204 may comprise a specially configured application specific integrated circuit (ASIC). The processor 204 generally functions to run programming code implementing various other functions performed by the target communication endpoint 104 or communication server 116. As will be described in greater detail elsewhere herein, such functions may include e-mail messaging, telephony, facsimile, instant messaging or other communication functions in the case of a target communication endpoint 104. As further examples, such functions may include the processing, delivery, and storage of one or more e-mail, voice mail, facsimile or instant messaging messages in connection with a communication server 116.

A target communication endpoint 104 or a communication server 116 may additionally include memory 208 for use in connection with the execution of programming by the processor 204, and for the temporary or long term storage of data or program instructions. For example, the memory 208 may be used in connection with the operation of a messaging application that provides an OOF autoreply selectively. The memory 208 may comprise solid state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of input devices 212 include a microphone, keyboard, numeric keypad, scanner and pointing device combined with a screen or other position encoder. Examples of user output devices 216 include a speaker, alphanumeric display, ringer, printer port, IrDA port, and printer.

A communication device 104 or a communication server 116 may also include data storage 220 for the storage of application programming and/or data. For example, operating system software 224 may be stored in the data storage 220. Examples of applications that may be stored in data storage 220 include messaging application software 228, messaging directories 232 and/or spam filter applications 236. As can be appreciated by one of skill in the art, a messaging application 228 may comprise program instructions for implementing a voice, text, fax or other mailbox. As a further example, the messaging application 228 may comprise a unified messaging application. In accordance with embodiments of the present invention, the messaging application 228 may additionally provide or be associated with communication functions, and therefore may include an e-mail program or application, telephony application, facsimile application, instant messaging application, or other communication application. In addition, the messaging application 228 allows an OOF autoreply to be selectively provided in response to an incoming message when the OOF autoreply function is selected by the user. The OOF autoreply may be in the form of an automated text message, for example in response to a received e-mail or instant message, a voice greeting, or a confirmation that facsimile functions are available. Other forms of OOF autoreply are also possible. As will be described in greater detail elsewhere herein, whether or not an OOF autoreply is provided is, according to embodiments of the present invention, determined based in part on information associated with the incoming message. The messaging application 228 may additionally include an unauthorized sender list that allows a user to identify particular sending addresses as sources of spam. The messaging directories 232 may comprise address lists or books that are accessible by the messaging application 228. Examples of messaging directories 232 include personal address books, corporate directories, and automatically generated contact lists. The spam filter 236 is optionally included, and may comprise an algorithm for analyzing information associated with an incoming message to determine whether that message comprises spam. As can be appreciated by one of skill in the art from the description provided herein, the various applications stored in the data storage 220 of a target communication device may differ from those stored in a communication server 220. For example, the messaging application 228 on a communication endpoint 104 may provide communications functions, such as allowing an email message to be composed and sent, while a messaging application 228 or a communication server 116 may provide mailboxes for stored messages.

A target communication endpoint 104 or communication server 116 may also include one or more network interfaces 240. For example, a target communication endpoint 104 or a communication server 116 may include a communication network interface 240 comprising a packet data network interface, such as a wired or wireless Ethernet interface, for example where the target communication endpoint 104 or communication server 116 comprises a general purpose computer. Additional examples of a communication network interface 240 include a telephony network interface, such as a CDMA, TDM, GSM, PSM, satellite, ultrawide band, satellite telephony, IrDA or other wireless or wire line interfaces. The target communication endpoint 104 or communication server 116 may additionally include a communication bus 244 to allow communications between the various components of the device.

Figure 3:
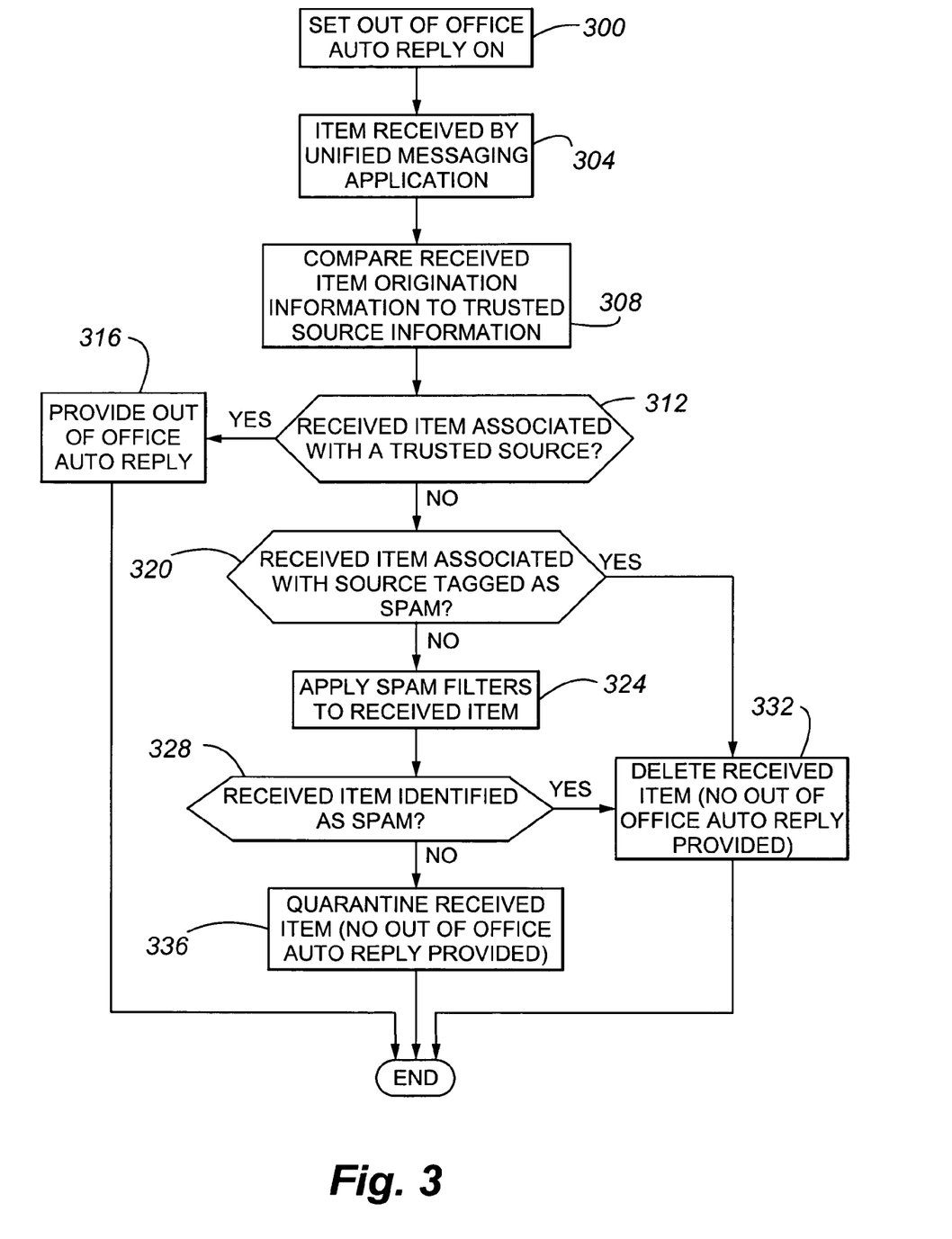
FIG. 3 is a flow chart depicting the operation of a system that allows for the selective application of an OOF autoreply in accordance with embodiments of the present invention.

With reference now to FIG. 3, aspects of the operation of a communication system 100 providing a selective OOF autoreply function are illustrated. Initially, a user sets the OOF autoreply on (step 300). In general, the OOF autoreply function is selected in connection with a particular target address 114. For example, the user may choose to enable the OOF autoreply function with respect to the user's e-mail account.

Furthermore, setting the OOF autoreply may include entering the content of the autoreply message that will be delivered in response to authorized messages received at the target address 114. Setting up the OOF autoreply may be accomplished using a communication endpoint 104 running or capable of accessing the messaging application 228 providing the OOF autoreply functionality with respect to the target address 114.

At step 304, an item or incoming message is received by the messaging application 228 associated with the target address 114. Continuing the example of an e-mail communication channel, the messaging application 228 may comprise a unified messaging application. After receiving the incoming item or message, origination or address information associated with that received message is compared to trusted source information (step 308). In accordance with embodiments of the present invention, trusted sources may comprise addresses included in the user's messaging directories 232. In accordance with still other embodiments of the present invention, trusted sources may comprise only those addresses included in the user's messaging directories 232 that have been selected or marked as trusted, either manually or automatically. As still another example, trusted sources may include addresses included in a company internal directory, or addresses from which the user has accepted communications in the past.

At step 312, a determination is made as to whether the received message is associated with a trusted source. If the received message is found to be associated with a trusted source, an OOF autoreply message is provided (step 316). As can be appreciated, the OOF autoreply message is sent to the initiating address 115.

If the received message is not associated with a trusted source, a determination is next made as to whether that message is associated with a source or initiator address 115 that has been tagged or identified as a source of spam (step 320). For example, the messaging application 228 may determine whether the initiator address 115 is included in a spam list or unauthorized sender list created by the user associated with the target address 114. In addition to addresses that have been manually identified as being associated with unauthorized senders, any external address (e.g. an address external to the user's corporate intranet or LAN) may be treated as being associated with an unauthorized sender. If the initiator address 115 of the received message is not included in the spam list for the target address 114, spam filters may be applied to the received message (step 324). A determination may then be made as to whether the received item is identified by the spam filter as a spam message (step 328). If the received item is identified as spam at either step 320 or step 328, the received message is deleted or ignored, and no OOF autoreply is provided (step 332).

If the received item is not identified as spam, the received message may be quarantined, and no OOF autoreply is provided (step 336). Accordingly, for messages that cannot be identified as authorized or unauthorized, and are therefore indeterminate, the content of the incoming message may be preserved or stored, for example, in the data storage 220 of a target communication device 104 or a communications server 116, for a later review by the user. That is, the incoming message may be quarantined. Placing a message in quarantine may comprise placing it in a specially marked file or folder. Furthermore, because no OOF autoreply message is provided to the initiator address 115 associated with such an indeterminate message, the validity of the target address 114 is not confirmed, and the sender is not informed that the user associated with the target address 114 is out of the office or otherwise unavailable.

In connection with incoming messages that are unauthorized or indeterminate, the response of the messaging application 228 to receipt of such messages is generally the same as the response of that application to messages received while the OOF autoreply function is not selected. For example, in connection with an e-mail application, no confirmation or reply message of any sort may be provided to the initiating address 115. In the context of voice and/or video telephony, the user's standard greeting may be played back to the initiating address, instead of a temporary greeting (a type of OOF autoreply) informing the caller that the user is out of the office. Alternatively in the case of voice and facsimile, suppression of an OOF autoreply may comprise suppressing the greeting or fax go ahead completely and terminating the call.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

The invention claimed is:

1. A method for selectively providing an autoreply to an incoming message, comprising:
   enabling an autoreply function;
   receiving an incoming message from a sender having a source address;
   comparing information associated with said incoming message to a list of trusted sources;
   determining if said incoming message is associated with a trusted source;
   triggering the autoreply function;
   if said incoming message is associated with a trusted source, providing a first out of office autoreply to the source address associated with said incoming message in reply to the incoming message;
   if said incoming message is not associated with a trusted source, comparing information associated with said incoming message to a list of unauthorized sources;
   determining if said incoming message is associated with an unauthorized source;
   if said incoming message is associated with an unauthorized source, one of a group consisting of deleting said incoming message and ignoring said incoming message;
   if said incoming message is not associated with an unauthorized source, applying a first filter to information associated with said incoming message;
   in response to applying the first filter, determining if the said incoming message is a spam message;
   if the said incoming message is determined to be a spam message, one of a group consisting of deleting said incoming message and ignoring said incoming message;
   if said incoming message is not associated with a trusted source, not associated with an unauthorized source, and not determined to be a spam message, at least one of:
   a) triggering the autoreply function to send a second autoreply message to the source address associated with said incoming message in reply to the incoming message, wherein the second autoreply message is not an out of office autoreply message; or
   b) suppressing an answer message; and
   if said incoming message is not associated with a trusted source, not associated with an unauthorized source, and not determined to be a spam message, quarantining the incoming message.

2. The method of claim 1, wherein said information associated with said incoming message comprises a source address.

3. The method of claim 1, wherein said information associated with said incoming message comprises at least a portion of a content of said message.

4. A computational component for performing a method, the method comprising:
   detecting a selection to provide a first autoreply message comprising an out of office autoreply message to an authorized incoming message;
   triggering the autoreply function;
   detecting a first incoming message having source address information;
   determining whether source address information associated with said first incoming message matches address information included in a trusted sender list; and
   if said source address information associated with said first incoming message does match address information included in said trusted sender list, sending a first autoreply to said source address associated with said first incoming message, wherein said first autoreply message is an out of office autoreply message;
   if said source address information associated with said first incoming message does not match address information included in said trusted sender list, comparing said source address information to a list of unauthorized sources;
   determining if said first incoming message is associated with an unauthorized source;
   if said first incoming message is associated with an unauthorized source, one of a group consisting of deleting said first incoming message and ignoring said first incoming message;
   if said first incoming message is not associated with an unauthorized source, applying a first filter to information associated with said first incoming message;
   in response to applying the first filter determining if said first incoming message is spam;
   if said first incoming message is spam, deleting the message;
   if said first incoming message is not associated with a trusted source, not associated with an unauthorized source, and not determined to be a spam message, at least one of:
   quarantining the message;
   triggering the autoreply function to send said second autoreply message to said source address associated with said first incoming message, wherein said second autoreply message is not an out of office autoreply message, and wherein said first autoreply message is not sent to said source address associated with said first incoming message;
   suppressing an answer message; and if said incoming message is not associated with a trusted source, not associated with an unauthorized source, and not determined be a spam message, quarantining the incoming message.

5. The method of claim 4, further comprising:
detecting a second incoming message;
determining whether source address information associated with said second incoming message matches address information included in said trusted sender list; and
in response to determining that said source address information associated with said second incoming message matches address information included in said trusted sender list, providing said first autoreply message.

6. The method of claim 4, wherein determining if said first incoming message is spam comprises:
determining whether said source address information associated with said first incoming message matches address information included in an unauthorized sender list;
determining whether said first incoming message contains information indicating that said first incoming message is from an unauthorized source; and
in response to determining that said source address information associated with said first incoming message matches information included in said unauthorized sender list or determining that said first incoming message contains information indicating that said first incoming message is from an unauthorized source, deleting said first incoming message.

7. The method of claim 6, wherein said unauthorized sender list comprises at least one of a junk mail sender list, a spam mail list and a blocked source address list.

8. The method of claim 6, wherein said determining whether said first incoming message contains information indicating that said first incoming message is from an unauthorized source further comprises filtering a content of said incoming message.

9. The method of claim 4, wherein said trusted sender list comprises at least one of a user address book, a corporate directory and a user contact list.

10. The method of claim 4, wherein said computational component comprises a logic circuit.

11. The method of claim 4, wherein said computational component comprises a computer readable storage medium containing instructions for performing the method.

12. The method of claim 4, wherein said second autoreply message is a standard voice greeting.

13. A system for selectively providing an autoreply message, comprising:
a target communication device operable to receive an incoming message addressed to a target address from a communication network, the incoming address consisting of a voice message or a facsimile message;
a list of authorized sources;
a filter application, wherein said filter application is operable to analyze at least one of a content of said incoming message and a sending address associated with said incoming message, and wherein the filter application is further operable to:
compare information associated with said incoming message to a list of trusted sources;
determine if said incoming message is trusted;
if said incoming message is not trusted, compare information associated with said incoming message to a list of unauthorized sources;
determine if said incoming message is unauthorized;
if said incoming message in not unauthorized, determine if the said incoming message is spam;
a messaging application operable to:
if said incoming message is associated with trusted, providing a first out of office autoreply to the sending address associated with said incoming message in reply to the incoming message;
if said incoming message is unauthorized, one of a group consisting of deleting said incoming message and ignoring said incoming message;
if the said incoming message is determined to be spam, one of a group consisting of deleting said incoming message and ignoring said incoming message;
if said incoming message is not trusted, not unauthorized, and not spam, at least one of:
a) triggering the autoreply function to send a second autoreply message to the source address associated with said incoming message in reply to the incoming message, wherein the second autoreply message is not an out of office autoreply message; or
b) suppressing an answer message; and
if said incoming message is not trusted, not unauthorized, and not spam, quarantining the incoming message.

14. The system of claim 13, further comprising:
a list of unauthorized sources, wherein said messaging application determines whether said incoming message is unauthorized by comparing information associated with said incoming message to said list of unauthorized sources.

15. The system of claim 14, further comprising:
data storage, wherein an incoming message that is not determined to be authorized is deleted and is not stored on said data storage.

16. The system of claim 13, further comprising:
data storage, wherein an incoming message that is determined to be either unauthorized or indeterminate is placed in quarantine on said data storage.

17. The system to claim 13, further comprising:
a communication network operably interconnected to said target communication device; and
a communication server operably interconnected to said communication network, wherein said messaging application is executed by said communication server.

18. The system of claim 17, wherein at least a first copy of said authorized list of communication sources is stored on said communication server.

19. The system of claim 13, further comprising:
an initiating communication device, wherein said incoming message is sent from said initiating communication device.

20. The system of claim of claim 13, wherein said target communication device comprises one of a telephone or a facsimile machine.

21. The system of claim 13, wherein said communication network comprises one of an IP network and the public switched telephony network.

22. A system for controlling provision of an automated reply, comprising:
means for enabling an autoreply function;
means for receiving an incoming message from a sender having a source address;
means for comparing information associated with said incoming message to a list of trusted sources;
means for determining if said incoming message is associated with a trusted source;
means for triggering the autoreply function;

if said incoming message is associated with a trusted source, means for providing a first out of office autoreply to the source address associated with said incoming message in reply to the incoming message;

if said incoming message is not associated with a trusted source, means for comparing information associated with said incoming message to a list of unauthorized sources;

means for determining if said incoming message is associated with an unauthorized source;

if said incoming message is associated with an unauthorized source, one of a group consisting of means for deleting said incoming message and means for ignoring said incoming message;

if said incoming message is not associated with an unauthorized source, means for applying a first filter to information associated with said incoming message;

in response to applying the first filter, means for determining if the said incoming message is a spam message;

if the said incoming message is determined to be a spam message, one of a group consisting of means for deleting said incoming message and means for ignoring said incoming message;

if said incoming message is not associated with a trusted source, not associated with an unauthorized source, and not determined to be a spam message, at least one of:

a) means for triggering the autoreply function to send sending a second autoreply message to the source address associated with said incoming message in reply to the incoming message, wherein the second autoreply message is not an out of office autoreply message; or b) means for suppressing an answer message; and if said incoming message is not associated with a trusted source, not associated with an unauthorized source, and not determined to be a spam message, means for quarantining the incoming message.

23. The system of claim 22, further comprising:

means for determining whether a content of said message associates said message with an unauthorized sender.

24. The system of claim 22, wherein the answer message that is suppressed is a voicemail greeting.

25. The system of claim 22, wherein the answer message that is suppressed is a fax answer tone.

26. The system of claim 22, wherein said message is a voice message.

27. The system of claim 22, wherein said message is a facsimile message.

28. The system of claim 22, wherein said message is an email message.

29. The system of claim 22, wherein said means of filtering is governed by at least one rule created by a user's analysis of a quarantined message.

\* \* \* \* \*

UNITED STATES PATENT AND TRADEMARK OFFICE
CERTIFICATE OF CORRECTION

PATENT NO. : 7,844,669 B1  
APPLICATION NO. : 10/944062  
DATED : November 30, 2010  
INVENTOR(S) : David S. Mohler Page 1 of 1

It is certified that error appears in the above-identified patent and that said Letters Patent is hereby corrected as shown below:

At column 9, line 3, after "determined" insert --to--.

At column 10, line 1, "in" should be changed to --is--.

At column 10, line 39, "to" should be changed to --of--.

At column 10, line 52, after "The system of claim", delete "of claim".

Signed and Sealed this  
Twelfth Day of April, 2011

David J. Kappos  
*Director of the United States Patent and Trademark Office*